(12) United States Patent
Majumdar et al.

(10) Patent No.: US 9,178,790 B2
(45) Date of Patent: Nov. 3, 2015

(54) METHODS, SYSTEMS, AND COMPUTER READABLE MEDIA FOR CONTROLLING TX AND RX THROUGHPUT OVER TCP

(75) Inventors: Partha Majumdar, Woodland Hills, CA (US); Maksim Pyatkovskiy, Encino, CA (US)

(73) Assignee: Ixia, Calabasas, CA (US)

( * ) Notice: Subject to any disclaimer, the term of this patent is extended or adjusted under 35 U.S.C. 154(b) by 381 days.

(21) Appl. No.: 13/567,747

(22) Filed: Aug. 6, 2012

(65) Prior Publication Data

US 2014/0036700 A1    Feb. 6, 2014

(51) Int. Cl.
*H04L 12/26*    (2006.01)
*H04L 12/801*    (2013.01)
*H04L 12/807*    (2013.01)

(52) U.S. Cl.
CPC .......... *H04L 43/0888* (2013.01); *H04L 47/193* (2013.01); *H04L 47/27* (2013.01)

(58) Field of Classification Search
CPC .... H04L 43/0888; H04L 47/193; H04L 47/27
USPC ........................................................ 370/252
See application file for complete search history.

(56) References Cited

U.S. PATENT DOCUMENTS

| | | |
|---|---|---|
| 5,247,517 A | 9/1993 | Ross et al. |
| 5,327,437 A | 7/1994 | Balzer |
| 5,343,463 A | 8/1994 | van Tetering et al. |
| 5,477,531 A | 12/1995 | McKee |
| 5,535,338 A | 7/1996 | Krause et al. |
| 5,568,471 A | 10/1996 | Hershey et al. |
| 5,590,285 A | 12/1996 | Krause et al. |
| 5,600,632 A | 2/1997 | Schulman |
| 5,657,438 A | 8/1997 | Wygodny |
| 5,671,351 A | 9/1997 | Wild |
| 5,761,486 A | 6/1998 | Watanabe |
| 5,787,253 A | 7/1998 | McCreery et al. |
| 5,838,919 A | 11/1998 | Schwaller et al. |

(Continued)

FOREIGN PATENT DOCUMENTS

EP     0 895 375 B1     8/2004

OTHER PUBLICATIONS

"A TCP Tutorial," ssfnet.org/Exchange/tcp/tcpTutorialNotes.html, pp. 1-10 (Apr. 4, 2012).

(Continued)

*Primary Examiner* — Jung Park
*Assistant Examiner* — Albert Shih
(74) *Attorney, Agent, or Firm* — Jenkins, Wilson, Taylor & Hunt, P.A.

(57) ABSTRACT

A first node that transmits TCP packets to and receives TCP packets from a second node splits a target TCP packet throughput across multiple consecutive time slots, each slot having a target throughput value. If a current slot's achieved throughput value does not match the current slot's target throughput value, the target throughput value for the current slot and/or a subsequent slot is adjusted. Transmit throughput from the first node to the second node is controlled by transmitting TCP packets from the first node to the second node according to a target throughput value for the current slot. Receive throughput from the second node to the first node is controlled by dynamically calculating an advertised receive window size according to a target throughput value for the current slot and communicating the advertised receive window size to the second node.

20 Claims, 3 Drawing Sheets

(56) References Cited

U.S. PATENT DOCUMENTS

| | | | |
|---|---|---|---|
| 5,878,032 | A | 3/1999 | Mirek et al. |
| 5,881,237 | A | 3/1999 | Schwaller et al. |
| 5,905,713 | A | 5/1999 | Anderson et al. |
| 5,937,165 | A | 8/1999 | Schwaller et al. |
| 5,974,237 | A | 10/1999 | Shurmer et al. |
| 6,028,847 | A | 2/2000 | Beanland |
| 6,044,091 | A | 3/2000 | Kim |
| 6,061,725 | A | 5/2000 | Schwaller et al. |
| 6,065,137 | A | 5/2000 | Dunsmore et al. |
| 6,108,800 | A | 8/2000 | Asawa |
| 6,122,670 | A | 9/2000 | Bennett et al. |
| 6,148,277 | A | 11/2000 | Asava |
| 6,157,955 | A | 12/2000 | Narad et al. |
| 6,172,989 | B1 | 1/2001 | Yanagihara et al. |
| 6,173,333 | B1 | 1/2001 | Jolitz |
| 6,189,031 | B1 | 2/2001 | Badger |
| 6,233,256 | B1 | 5/2001 | Dieterich et al. |
| 6,279,124 | B1 | 8/2001 | Brouwer |
| 6,321,264 | B1 | 11/2001 | Fletcher |
| 6,345,302 | B1 | 2/2002 | Bennett et al. |
| 6,360,332 | B1 | 3/2002 | Weinberg |
| 6,363,056 | B1 | 3/2002 | Beigi et al. |
| 6,397,359 | B1 | 5/2002 | Chandra et al. |
| 6,401,117 | B1 | 6/2002 | Narad |
| 6,408,335 | B1 | 6/2002 | Schwaller et al. |
| 6,421,730 | B1 | 7/2002 | Narad |
| 6,434,513 | B1 | 8/2002 | Sherman et al. |
| 6,446,121 | B1 | 9/2002 | Shah |
| 6,507,923 | B1 | 1/2003 | Wall et al. |
| 6,545,979 | B1 | 4/2003 | Poulin |
| 6,601,098 | B1 | 7/2003 | Case |
| 6,621,805 | B1 | 9/2003 | Kondylis et al. |
| 6,625,648 | B1 | 9/2003 | Schwaller et al. |
| 6,625,689 | B2 | 9/2003 | Narad |
| 6,662,227 | B2 | 12/2003 | Boyd et al. |
| 6,708,224 | B1 | 3/2004 | Tsun et al. |
| 6,763,380 | B1 | 7/2004 | Mayton et al. |
| 6,789,100 | B2 | 9/2004 | Nemirovsky |
| 6,920,407 | B2 | 7/2005 | Adamian et al. |
| 6,950,405 | B2 | 9/2005 | Van Gerrevink |
| 7,006,963 | B1 | 2/2006 | Maurer |
| 7,010,782 | B2 | 3/2006 | Narayan et al. |
| 7,516,216 | B2 | 4/2009 | Ginsberg et al. |
| 8,010,469 | B2 | 8/2011 | Kapoor et al. |
| 8,135,657 | B2 | 3/2012 | Kapoor et al. |
| 8,145,949 | B2 | 3/2012 | Silver |
| 8,341,462 | B2 | 12/2012 | Broda et al. |
| 8,402,313 | B1 | 3/2013 | Pleis et al. |
| 8,510,600 | B2 | 8/2013 | Broda et al. |
| 8,522,089 | B2 | 8/2013 | Jindal |
| 8,676,188 | B2 | 3/2014 | Olgaard |
| 8,839,035 | B1 | 9/2014 | Dimitrovich et al. |
| 2002/0080781 | A1 | 6/2002 | Gustavsson |
| 2003/0009544 | A1 | 1/2003 | Wach |
| 2003/0012141 | A1 | 1/2003 | Gerrevink |
| 2003/0033406 | A1 | 2/2003 | John et al. |
| 2003/0043434 | A1 | 3/2003 | Brachmann et al. |
| 2003/0231741 | A1 | 12/2003 | Rancu et al. |
| 2006/0268933 | A1 | 11/2006 | Kellerer et al. |
| 2008/0285467 | A1 | 11/2008 | Olgaard |
| 2008/0298380 | A1 | 12/2008 | Rittmeyer et al. |
| 2009/0100296 | A1 | 4/2009 | Srinivasan et al. |
| 2009/0100297 | A1 | 4/2009 | Srinivasan et al. |
| 2010/0050040 | A1* | 2/2010 | Samuels et al. ............... 714/749 |
| 2011/0238855 | A1 | 9/2011 | Korsunsky et al. |
| 2011/0283247 | A1 | 11/2011 | Ho et al. |
| 2012/0192021 | A1 | 7/2012 | Jindal |
| 2012/0240185 | A1 | 9/2012 | Kapoor et al. |
| 2012/0314576 | A1* | 12/2012 | Hasegawa et al. ............ 370/235 |
| 2013/0111257 | A1 | 5/2013 | Broda et al. |
| 2013/0286860 | A1 | 10/2013 | Dorenbosch et al. |
| 2014/0160927 | A1 | 6/2014 | Majumdar et al. |
| 2014/0173094 | A1 | 6/2014 | Majumdar et al. |
| 2014/0289561 | A1 | 9/2014 | Majumdar et al. |

OTHER PUBLICATIONS

"IxLoad," Solution Brief, 915-3030-01. D, Ixia, pp. 1-4 (Feb. 2012).

Mneimneh, "Computer Networks Flow control with TCP," pp. 1-5 (Publication Date Unknown).

Notice of Allowance and Fee(s) Due for U.S. Appl. No. 13/871,909 (Apr. 20, 2015).

Notice of Allowance and Fee(s) Due for U.S. Appl. No. 13/712,499 (Mar. 11, 2015).

Non-Final Office Action for U.S. Appl. No. 13/718,813 (Jan. 14, 2015).

Non-Final Office Action for U.S. Appl. No. 13/871,909 (Nov. 20, 2015).

Non-Final Office Action for U.S. Appl. No. 13/712,499 (Jul. 14, 2014).

"Ixload Specifications," http://web.archive.org/web/20130127053319///www.ixiacom.com/products/network_test/applications/ixload/specifications/index.php. pp. 1-7, (Jan. 27, 2013).

Notice of Allowance and Fee(s) Due for U.S. Appl. No. 11/462,351 (Feb. 6, 2009).

Restriction Requirement for U.S. Appl. No. 11/462,351 (Jan. 2, 2009).

Ye et al., "Large-Scale Network Parameter Configuration Using an On-Line Simulation Framework," Technical report, ECSE Department, Rensselear Polytechnic Institute (2002).

Business Wire, "Ixia's Web Stressing and In-Service Monitoring Products Names Best of Show Finalist at NetWorld+Interop 2001, Atlanta," 2 pages (Sep. 10, 2001).

PRNewsWire, "Caw Network Doubles Performance of Real-World Capacity Assessment Appliance Suite: WebAvalanche and WebReflector Now Generate and Respond to 20,000+ HTTP requests per Second With Over One Million Open Connections," 2 pages (Sep. 10, 2001).

Care Networks, Inc. and Foundry Networks, Inc., "Caw Networks Performance Brief: Caw Networks and Foundry Networks 140,000 Transactions per Second Assessment," 1 page (Sep. 7, 2001).

MacVittle, "Online Only: CAW's WebReflector Makes Load-testing a Cakewalk," Network Computing, 2 pages (Sep. 3, 2001).

Business Wire, "REMINDER/Caw Networks to Spotlight WebAvalanche 2.0 and WebReflector At Networld+Interop," 2 pages (May 8, 2001).

"Caw Networks Unveils New Web-Stressing Appliance," press release from Caw Networks, Inc., 2 pages (Mar. 5, 2001).

Ye et al., "Network Management and Control Using collaborative On-Line Simulation," Proc. IEEE International Conference on Communications ICC2001, Helsinki, Finland, pp. 1-8 (2001).

Business Wire, "NetIQ's Charlot 4.0 Goes Internet-Scale; ASP's and Service Providers Can Conduct Tests With Up to 10,000 Connections; New Visual Test Designer Simplifies Testing of All Sizes," 1 page (Oct. 23, 2000).

Business Wire, "Spirient Communications TereMetrics and NetIQ's Charlot Work Together to Create First Complete Network Performance Analysis Solution," 2 pages (Sep. 25, 2000).

Kovacs, "Validate your equipment performance—Netcom Systems' SmartBits—Hardware Review—Evaluation," Communications News, 2 pages (May 2000).

Marchette, "A Statistical Method for Profiling Network Traffic," USENIX (Apr. 12-19, 1999).

Cooper et al., "Session traces: an enhancement to network simulator," Performance, computing and Communications Conference, Scottsdale, AZ (Feb. 1, 1999).

San-qi, et al., "SMAQ: A Measurement-Based Tool for Traffic Modeling and Queuing Analysis Part I; Design methodologies and software architecture," IEEE Communications Magazine, pp. 56-65 (Aug. 1, 1998).

San-qi, et al., SMAQ: A Measurement-Based Tool for Traffic Modeling and Queuing Analysis Part II; Network Applications, IEEE Communications Magazine, pp. 66-77 (Aug. 1, 1998).

* cited by examiner

METHODS, SYSTEMS, AND COMPUTER READABLE MEDIA FOR CONTROLLING TX AND RX THROUGHPUT OVER TCP

TECHNICAL FIELD

The subject matter described herein relates to methods and systems for measuring the performance of devices that process transmit control protocol (TCP) traffic. More particularly, the subject matter described herein relates to methods, systems, and computer readable media for controlling transmit (Tx) and receive (Rx) throughput over TCP.

BACKGROUND

Devices such as firewalls, server load balancers, and deep packet inspection devices intercept application traffic travelling over TCP connections and may forward them after some level of processing. Other devices operate as end points for TCP connections and may serve the application level requests received over those connections. For both types of devices, one measurement of performance is the rate at which they can process bytes coming from both directions (client and server) without any errors.

In order to measure this rate, a tool is needed which can initiate data from a client and receive data from server at a certain configured rate. An ideal approach could be to divide the configured rate among client and server and let each side generate data based the unidirectional rate calculated for that respective side. This approach has the disadvantage, however, that both sides must be controlled. For example, in a simple network in which a piece of test equipment communicates with a device under test (DUT), the tester can directly control how much traffic it transmits to the DUT but is not likely to be able to directly control how much traffic the DUT transmits to the tester. Even if the DUT can be directly controlled by the tester, this approach works well only if both sides can generate data independent of each other.

For most ISO Layer 7 protocols, however, that is not the case. Most of the Layer 7 protocols are request/response based and hence the initiation rate of one side may be dependent upon the initiation rate of the other side. For example, the initiation rate of a server that provides responses to requests that are generated by a client is dependent upon the initiation rate of the requests. In a request/response protocol, the response rate is driven by the request rate; there is no mechanism by which the response rate can be controlled independently of the request rate. Even if the protocol did have such a mechanism, where the client and server are running on two different systems with timers that are not in sync with each other, it is difficult if not impossible to provide the coordination and control necessary to implement the ideal approach described above.

As a result of these limitations, a conventional approach is to attempt to control the bi-directional data rate from one end, e.g., via the client in a client-server arrangement. Although the client can directly control the rate of data transmitted, such as controlling the number of requests that are issued, and thus indirectly control the number of responses that the client can be expected to receive, the client cannot directly control the rate of data received. For example, a client has no direct control over a server's transmitted data rate. The same difficulty applies regardless of which end is being controlled. For example, when the server side is being controlled, the server's transmitted rate may be controlled but the server's received data rate, i.e., the clients transmitted data rate, cannot be controlled from the server side alone. Even when there is indirect control of the other party's data rate, such as where a request-response protocol is being used, conventional systems don't control the receive rate independently of the transmit rate.

Accordingly, in light of these difficulties associated with conventional solutions, there exists a need for methods, systems, and computer readable media for controlling both transmit and receive throughput over a TCP connection. Even more desirable is the ability to control both Tx and Rx throughput via a device that is either at one end of the connection or that intercepts traffic between the two ends of the connection.

SUMMARY

According to one aspect, the subject matter described herein includes a system for controlling transmit and receive throughput over TCP. The system includes a first node having a network interface for transmitting TCP packets to and receiving TCP packets from a second node over a packet network. The first node includes a throughput control module for splitting a target TCP packet throughput across a plurality of consecutive time slots, each slot having a target throughput value, where each slot's target throughput value is apportioned among one or more active sessions. The throughput control module determines whether a current slot's achieved throughput value matches that slot's target throughput value; if not, the throughput control module will adjust a target throughput value for the current slot and/or a subsequent slot. The throughput control module controls transmit throughput from the first node to the second node by transmitting TCP packets from the first node to the second node according to the target throughput value for the current slot. The throughput module controls receive throughput from the second node to the first node by dynamically calculating an advertised receive window size according to the target throughput value for the current slot and communicating the advertised receive window size to the second node.

According to another aspect, the subject matter described herein includes a method for controlling transmit and receive throughput over TCP. The method includes, at a first node that transmits TCP packets to and receives TCP packets from a second node, splitting a target TCP packet throughput across a plurality of consecutive time slots, each slot having a target throughput value, where each slot's target throughput value is apportioned among one or more active sessions; determining whether a current slot's achieved throughput value matches that slot's target throughput value, and if not, adjusting a target value for the current slot and/or a subsequent slot. Transmit throughput from the first node to the second node is controlled by transmitting TCP packets from the first node to the second node according to the target throughput value for the current slot. Receive throughput from the second node to the first node is controlled by dynamically calculating an advertised receive window size according to the target throughput value for the current slot and communicating the advertised receive windows size to the second node.

As used herein, the terms "session" and "connection" are used interchangeably and refer to communication between two entities via a telecommunication network, which may be a packet network, including networks that use the TCP protocol. For example, a session may be communication between an application on first node and an application on a second node, where the first application is identified by a first IP address and TCP port number combination and the second application is identified by a second IP address and TCP port number combination. A request to initiate a session may be referred to as a request to make a connection, or "a connection request." It will be understood by one of ordinary skill in the art that two hardware nodes may communicate multiple sessions across the same physical layer connection, e.g., a network cable may support multiple sessions simultaneously. As used herein, the term "active session" refers to a session that is either connecting, transmitting or receiving data, or disconnecting.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for controlling transmit and receive throughput over TCP are provided. In one embodiment, a first node, which transmits data to and receives data from a second node, controls transmit throughput to the second node by transmitting TCP packets from the first node to the second node according to a target transmit data rate and controls receive throughput from the second node by dynamically calculating an advertised TCP window size according to a target receive data rate and communicating the advertised TCP windows size to the second node.

There are several techniques that may applied independently or with other techniques to control transmit and receive throughput over TCP. One technique includes splitting a target throughput per second across multiple short (e.g., subsecond) time slots, each slot having a target throughput per slot. For example, in one embodiment, each slot is 100 ms in duration, but other slot sizes may be used. If the achieved throughput for a slot does not match the target throughput for that slot, the target throughput for one or more subsequent slots is adjusted accordingly to compensate. Another technique includes setting the initial window size for a new connection based on how many parallel connections can be present there at the current time slot and how much bandwidth remains and is available for use by the new session. Another technique includes, while transmitting data, adjusting the available bandwidth based on the amount of data that has already been sent. Another technique includes, while receiving data, adjusting the window of the connection based on the length of the data, available bandwidth, last advertised value of the window, and the number of parallel connections that may be opened in the current slot. Another technique includes detecting whether the window size of a particular connection has been reduced below the equal distribution value, and if so, readjusting the window sizes of the connections at the beginning of the next time slot. Each of these techniques will be described in more detail below.

Reference will now be made in detail to exemplary embodiments of the present invention, examples of which are illustrated in the accompanying drawings. Wherever possible, the same reference numbers will be used throughout the drawings to refer to the same or like parts.

Figure 1:
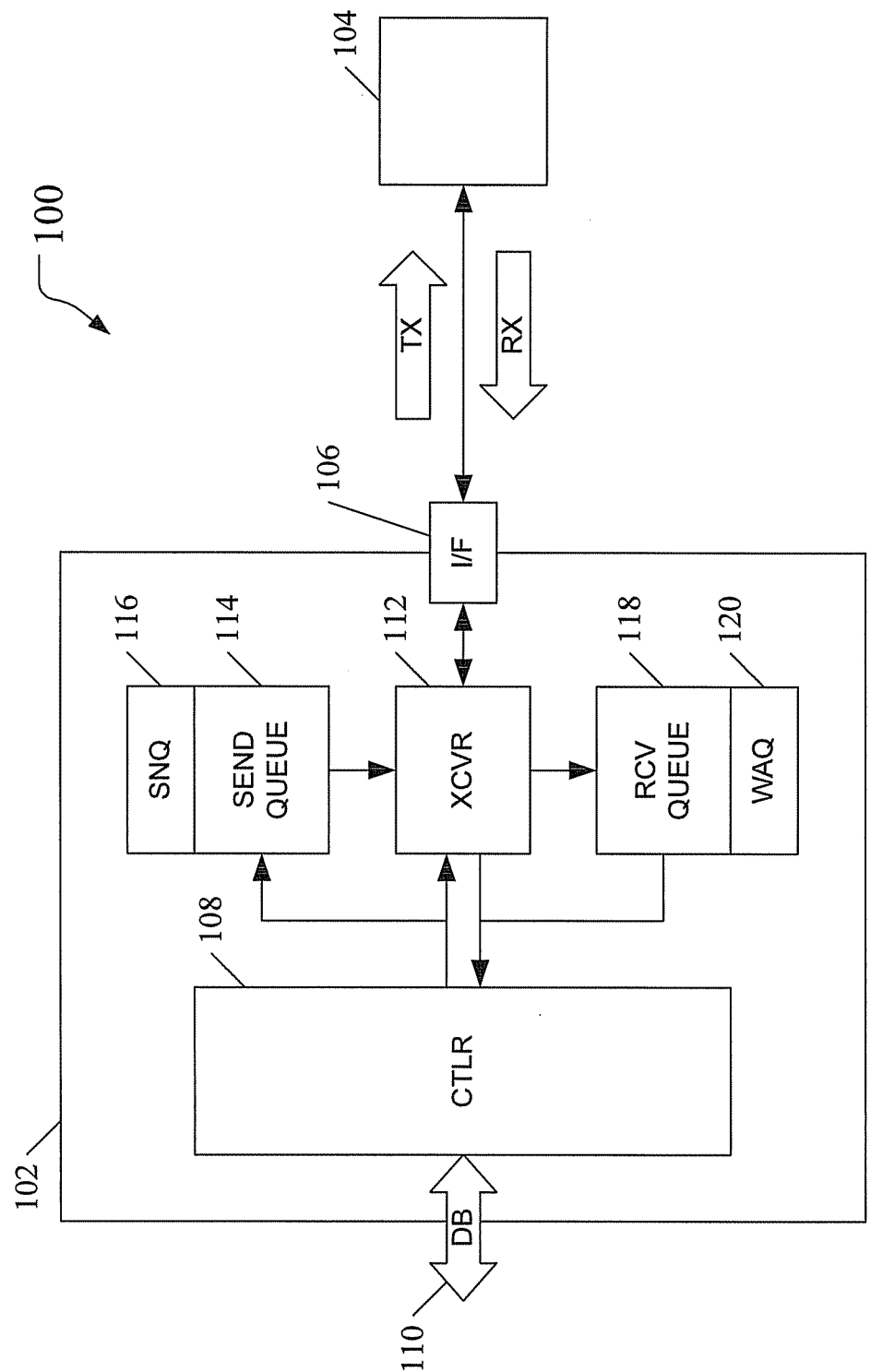
FIG. 1 is a block diagram illustrating an exemplary system for controlling transmit and receive throughput over TCP according to an embodiment of the subject matter described herein.

FIG. 1 is a block diagram illustrating an exemplary system for controlling transmit and receive throughput over TCP according to an embodiment of the subject matter described herein. System 100 includes a first node 102 which communicates TCP packets to a second node 104. In the embodiment illustrated in FIG. 1, first node 102 includes a network interface 106 for transmitting TCP packets to other nodes over a packet network and a throughput controller 108 for controlling transmit and receive throughput over TCP. Controller 108 receives data to be transmitted via a databus 110 and provides that data to a transceiver (XCVR) 112, which sends the data as TCP packets to second node 104 over a TCP-capable data link, such as an Internet protocol (IP) packet network. Transceiver 112 also receives TCP packet data from second node 104 and provides that data to controller 108, which outputs the received data over databus 110.

In one embodiment, controller 108 regulates the transmit throughput directly by controlling when and how much data is presented to transceiver 110 for transmission to second node 104. Thus, in one embodiment, first node 102 may include a temporary buffer for storing data that will eventually be transmitted to second node 104 but which is not transmitted at a given point in time because doing so would exceed a transmit throughput limit being imposed by controller 108. In the embodiment illustrated in FIG. 1, a send queue 114 is used for this purpose. For example, controller 108 may send transmit data directly to transceiver 112 until a transmit throughput limit is reached, at which time controller 108 may store any remaining data to be transmitted into send queue 114. In one embodiment, transceiver 112 may be configured to first draw data to be transmitted from send queue 114 before accepting additional data from controller 108 directly. In one embodiment, information about sessions that have been pushed to the send queue may be stored in a data storage area set aside for that purpose, SNQ 116. In one embodiment, the session identifier is stored in SNQ 116 and the pending data count is stored along with session information. When a session is woken up from SNQ 116 the session is given the chance to send any pending data that it may have, e.g., pending data that may be stored temporarily in send queue 114. In one embodiment this may be done by a callback mechanism. The callback mechanism may be different for different sessions depending on which layer 7 protocol (e.g., HTTP, SMTP, FTP, RTSP, etc.) is being used.

First node 102 may likewise include a temporary buffer for storing data that was received from second node 104 and that will eventually be output over databus 110 but which is not output over databus 110 at a given point in time because doing so would exceed a receive throughput limit being imposed by controller 108. In the embodiment illustrated in FIG. 1, a receive queue 118 is used for this purpose. For example, controller 108 may instruct transceiver 112 to forward received TCP data directly to controller 108 until a receive threshold has been reached, after which transceiver 112 may be instructed to direct additional received data into receive queue 118. In one embodiment, information about sessions that have been pushed to the receive queue may be stored in a data storage area set aside for that purpose, WAQ 120. In one embodiment, the session identifier is stored in WAQ 120 and the pending data count is stored along with session information. In one embodiment, the last advertised window size is stored at the TCP connection associated with the session and the session identifier is stored in WAQ if the window size of the session has been reduced below the equal distribution value. When a session is woken up from WAQ 120 the session is given a chance to increase its window size. In one embodiment, the session accesses the TCP connection information to get the last advertised window size. If the last advertised window size is smaller than the lesser of the ideal max and the remaining slot limit, the session's window size is increased. If the new advertised window size is still smaller than the ideal max, the session remains in WAQ 120. One embodiment, controller 108 may be configured to first draw data to be output to databus 110 from receive queue 118 before accepting additional data from transceiver 112 directly.

In one embodiment, controller 108 regulates the receive throughput indirectly by continually adjusting the advertised Rx window size that is regularly sent to second node 104. When first node 102 receives RX data from second node 104, TCP protocol provides that first node 102 should send a message to second node 104 to acknowledge the receipt of that data. The acknowledge message can also specify to second node 104 a change in the Rx window size of first node 102. In one embodiment, controlling the receive throughput includes splitting a target TCP packet transmit or receive throughput across multiple of consecutive time slots, each slot having a target throughput value, and determining whether a slot's achieved throughput value matches the slot's target throughput value. If the slot's achieved throughput value does not match the slot's target throughput value, the target throughput value for a subsequent slot is adjusted up or down.

In one embodiment, first node 102 uses the target throughput value for a subsequent slot to determine how much data to transmit to second node 104. In one embodiment, first node 102 uses the target throughput value for a subsequent slot to determine how big the advertised receive window size should be and send that advertised receive window size to second node 104.

Thus, in contrast to conventional systems that adjust the advertised window size to avoid a buffer overflow, controller 108 adjusts the advertised window size to regulate receive throughput. In contrast to conventional systems that consider the size and current fill level of the buffer when advertising a window size, controller 108 considers a target throughput or throughput budget when advertising a window size.

Figure 2:
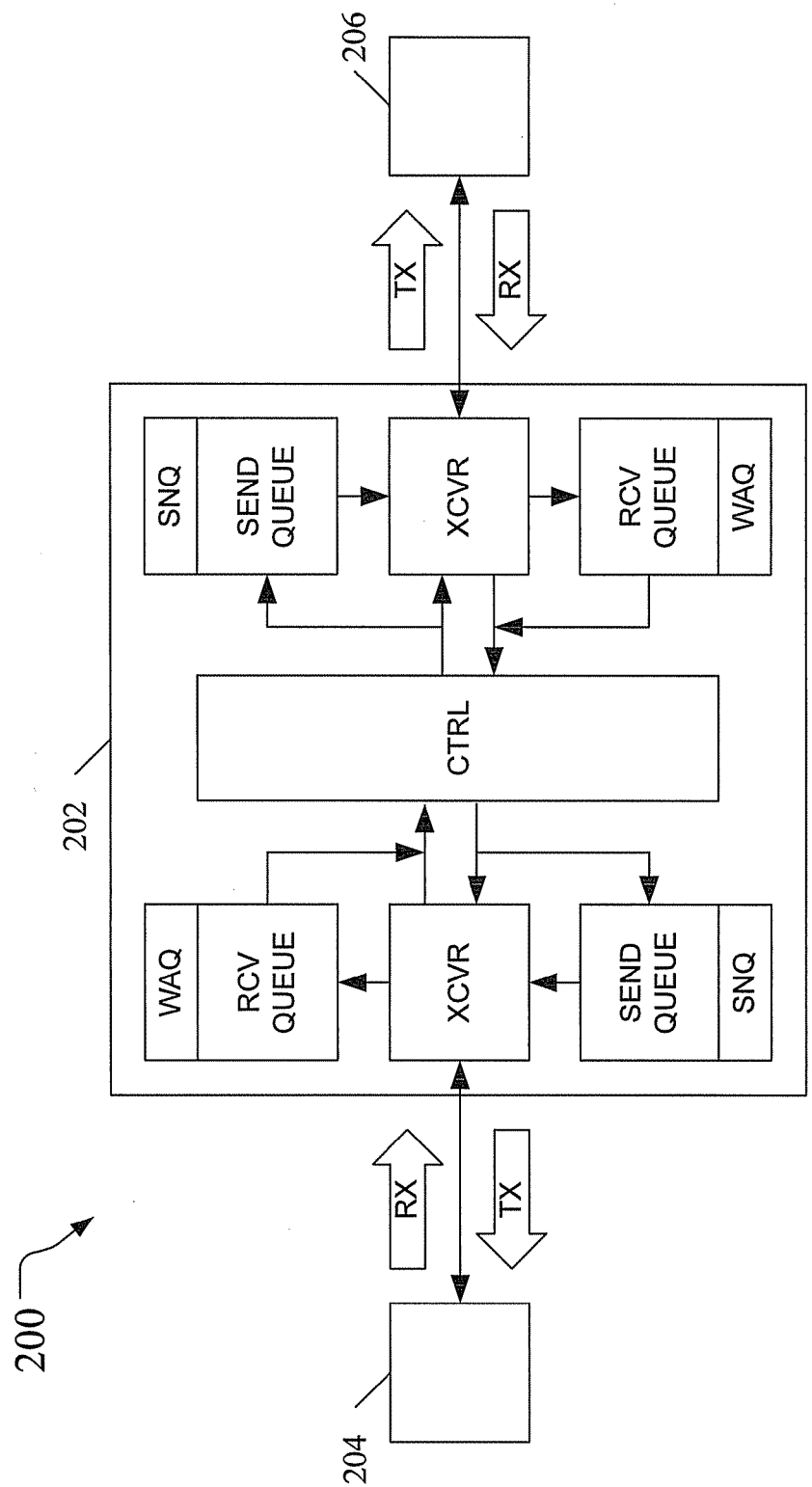
FIG. 2 is a block diagram illustrating an exemplary system for controlling transmit and receive throughput over TCP according to another embodiment of the subject matter described herein.

FIG. 2 is a block diagram illustrating an exemplary system for controlling transmit and receive throughput over TCP according to another embodiment of the subject matter described herein. In the embodiment illustrated in FIG. 2, a first node 202 controls TCP transmit and receive throughput between two endpoints 204 and 206. By controlling the throughput between itself and each endpoint individually, node 202 controls the throughput of traffic flowing between the two endpoints. This arrangement is useful when control of the individual endpoints is not possible.

Figure 3:
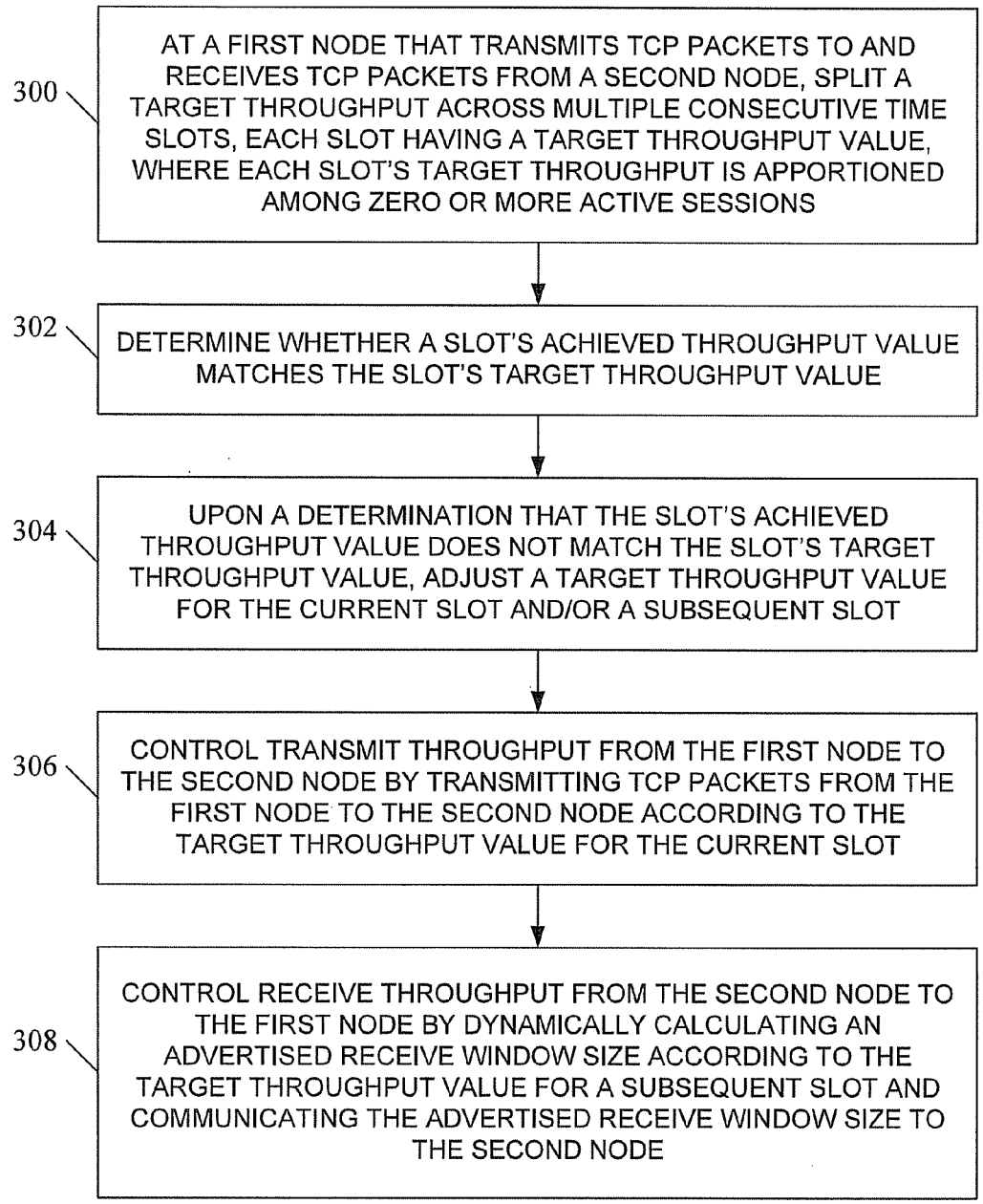
FIG. 3 is a flow chart illustrating an exemplary process for controlling transmit and receive throughput over TCP according to an embodiment of the subject matter described herein.

FIG. 3 is a flow chart illustrating an exemplary process for controlling transmit and receive throughput over TCP according to an embodiment of the subject matter described herein. For devices that operate as an endpoint in a TCP connection, the transmitted data rate can be controlled by the device itself. The received data rate, however, can be controlled by adjusting the targets over time and can be further controlled by adjusting the TCP window size. In the embodiment illustrated in FIG. 3, the method includes, at step 300, splitting a target throughput across multiple consecutive time slots, each slot having a target throughput value. At step 302, it is determined whether a slot's achieved throughput value matches the slot's target throughput value, and at step 304, if the slot's achieved throughput value does not match the slot's target throughput value, the target throughput value for the current slot and/or a subsequent slot is adjusted. At step 306, transmit throughput from the first node to the second node may be controlled by transmitting TCP packets from the first node to the second node according to the target throughput value for the current slot (which may or may not have been adjusted), and at step 308, receive throughput from the second node to the first node may be controlled by dynamically calculating an advertised receive window size according to the target throughput value and communicating the advertised receive window size to the second node.

For example, if a slot has a target throughput for 600 bytes per slot, and 300 bytes of data has already been transmitted during that slot, if 400 bytes of data are received during that slot, i.e., exceeding the target throughput by 100 bytes, the next slot's throughput will be reduced by 100 bytes to 500 bytes. The size of the advertised receive window may be reduced so that the remote node will limit its transmission throughput accordingly.

In one embodiment, the target throughput for the slot is a value that defines the target combined transmit and receive throughput for that slot. Alternatively, target throughputs for transmit and receive may be separately defined or calculated independent of each other.

Another aspect of controlling transmit and receive throughput over TCP involves performing one or more of the following: during operation, adjusting the window size of any new connection based on the number of parallel connections that may be present at the current time slot and the amount of bandwidth remaining; when transmitting data, adjusting the available bandwidth based on the amount of data that has been sent; when receiving data, adjusting the window of the connection based on the length of the data, the available bandwidth, the last advertised value of the window, and the number of parallel connections that may be opened in the current slot; and during operation, determining whether the window size of the connection is reduced below the equal distribution value, and if so, then readjusting the window sizes at the beginning of the next time slot. In one embodiment, the number of active sessions in a slot may vary from one slot to another. In one embodiment, the new sessions may be started only at the beginning of every slot.

An example operation of system 100 will be described in more detail below.

The following is a glossary of terms used herein:

TS Target throughput per second. This is the configured objective.

N The number of slots in each 1 second interval. (e.g., 10)

Tideal The ideal target per slot, defined as TS/N. The algorithm attempts to subtract overachieved margin of previous slots from this to compute T(i).

T(i) Target throughput for $i^{th}$ slot, for i=1 to ∞.

A(i) Achieved throughput in $i^{th}$ slot, for i=1 to ∞.

e(i) Extra achieved throughput for $i^{th}$ slot, defined as e(i)=A(i)−T(i), for i=1 to ∞. This can be negative. e(0) is assumed to be 0.

E(i) Cumulative extra achieved throughput up to and including the $i^{th}$ slot, for i=1 to ∞. E(0) is 0.

r(i) The negative of e(i), defined as r(i)=T(i)−A(i), for i=1 to ∞.

R(i) Cumulative r(i) up to and including the $i^{th}$ slot. The algorithm is defined in terms of E(i), but in one implementation the limits are calculated using R(i).

T Throughput limit left at the current point of time.

CC(i) Number of sessions those have been started before the $i^{th}$ slot begins, for i=1 to ∞.

MSS Maximum Segment Size

RMSS Configured Receive Maximum Segment Size.

IW The Rx window initially computed for a connection.

CW Configured initial Rx Window.

W Last advertised Rx window.

W' New computed Rx window.

[X] For any number X this is floor (X/RMSS)*RMSS (e.g., X is rounded down to the nearest multiple of RMSS.)

{X} Same as [X], but if the result is 0 then the result is set to RMSS.

M(i) Maximum window that can be advertised by any connection in the $i^{th}$ slot. Defined as M(i)={min(CW, T(i)/CC(i))}, for i=1 to ∞.

L Length of the current packet to be sent or being received.

SNQ The wait queue into which a session goes when it cannot send L amount of data due to lack of T.

WAQ The wait queue into which a session goes when maximum possible window size cannot be advertised due to lack of T.

All units are in bytes. Tideal is the total (two-way) ideal throughput per slot.

Calculation of T(i). To calculate distribution of the target throughput across the slots, the target throughput T for slot i, i.e., T(i), is computed as follows:

```
E(i−1) = E(i−2) + e(i−1)
If ( E(i−1) < Tideal ) {
    T(i) = Tideal − E(i−1)
    E(i−1) = 0
} Else {
    T(i) = 0
    E(i−1) = E(i−1) − Tideal
}
```

Thus, if the achieved throughput at slot i−1 is higher than Tideal, the target throughput at the slot i is reduced by the amount by which slot i−1 exceeded the target. However, if the overachievement value is too high, e.g., the throughput at slot i−1 was more than twice the target value Tideal, the target for slot i is set to zero to prevent further throughput and the cumulative excess E(i−1) is reduced by Tideal at every time slot, until the cumulative excess is less than Tideal, at which time the target value for a slot is set to a non-zero value to allow throughput to resume. The value of T(i) may be computed using R(i) instead of E(i):

```
R(i−1) = R(i−2) + r(i−1)
If ( R(i−1) > −Tideal ) {
    T(i) = Tideal + R(i−1)
    R(i−1) = 0
} Else {
    T(i) = 0
    R(i−1) = R(i−1) + Tideal
}
```

This mechanism operates to regulate both transmit throughput and receive throughput. Regulation of transmit throughput is straightforward: the node directly controls what it does and does not transmit. Regulation of receive throughput is less direct. As will be explained in more detail below, regulation of receive throughput is controlled by dynamic adjustment of the advertised receive window.

In one embodiment, Sessions context information is stored in SNQ and WAQ. Sessions maintain context of how much data was not sent or the size to which the window size was reduced. When T(i) is set, sessions from SNQ and WAQ are awakened according to the context information stored in SNQ and WAQ.

During periods where all active have little or no traffic, the value of E(i) will become increasingly negative and the value of R(i) will become increasingly positive, reflecting the cumulative lack of traffic. To prevent these large negative or positive values from affecting the calculations of T(i) once session traffic resumes, in one embodiment the values of E(i) or R(i) may be reset to some small value at every i which is a multiple of N if R(i) is positive. This will reduce number of spikes, especially when some intervals have very low throughput. In one embodiment, if very high throughput is achieved in some interval, then that compensation may be performed as needed, e.g., whether or not slot i is at an N slot boundary. Additionally, E(i) or R(i) may be reset whenever user adjustment logic changes the user count or the target objective value changes.

Transmit Throughput Limit Control. While sending, if length of the packet L is less than or equal to the available throughput T then the entire L amount of data will be sent out and the process will proceed to the next action. T will then be reduced by L. If T<L then T amount of data will be sent out, and T will be reduced to zero. The amount of unsent data (L−T) will be tracked by SNQ 116.

Receive Throughput Limit Control. Two distinct mechanisms may be employed to control receive throughput: calculation of the initial receive window size IW to be advertised to the remote node while first establishing a connection to the remote node, and dynamic adjustment of the advertised receive window size during the life of the connection. These will now be discussed in turn.

Regarding calculation of the initial receive window size IW, in one embodiment, while initiating a connection in the $i^{th}$ slot, IW is computed as in the following manner:

```
IW = min(M(i), T)
If IW < M(i) {
    Push the current session to WAQ
}
Initiate the connection with {IW}
```

Thus, the initial window size IW is the lesser of the maximum window size M(i) and the throughput currently available for use by all sessions T. If the value of IW is less than M(i) this indicates that the throughput currently available T was the limiting factor. In one embodiment, the current session is pushed into the wait queue WAQ 116 before the new connection is initiated using IW as the advertised receive window value. Although there is a possibility of overshoot because of the RMSS adjustment, this overshoot will be compensated in the next target computation. The value of T is not reduced in this situation because it is not known how much of the advertised window will be actually consumed in the current slot. If new users or sessions are added in the current time slot, they will not begin immediately in the current slot but will instead be started at the beginning of the next slot, which will increase the precision of the M(i) computation. Sessions may be placed at the head of a throttle queue.

Regarding dynamic adjustment of window size during the life of the connection, the throughput currently available for use by all sessions T is reduced by the length of the current packet to be sent or being received L. The resulting T may become negative, i.e., r(i) is negative and e(i) is positive. Because simply advertising a window of size min(M(i), T) may abruptly reduce the window size and because the advertised window cannot be less than (W−L), new window size W' is calculated in the following manner:

$$\text{Wtmp} = \min(M(i), T)$$
$$W' = \max([\text{Wtmp}], W-L)$$
Advertise the new window W'
If W' < M(i) { # i.e., if T < M(i)
    Push the session to WAQ
}

When an advertised window size abruptly becomes zero, this raises potential problems, especially with regards to data that is in transit at the time that the window effectively closed—that data may be considered successfully transmitted by the sender yet discarded by the receiver, resulting in a loss of data. The method described directly above regulates the window size to avoid this potential scenario, but raises another potential issue: because the window cannot be abruptly shrunk, it is possible that more data is allowed to arrive than there is available bandwidth, which may cause overshoot. However, this overshoot will be compensated in the next target computation.

In one embodiment, when waking a session from SNQ 114, the session performs the transmit throughput limit control operations described above. In one embodiment, when waking a session from WAQ 116, there is an attempt to increase the advertised window size in the following manner:

$$W' = \min(M(i), T)$$
Advertise max([W'], W) as the new window
If W' < M(i) {
    push the session to WAQ
}

New window value W' is the lesser of the maximum window that can be advertised by any connection in the slot and the throughput limit left at the current point in time. The advertised value will be either the new window value W' or the current window value W, whichever is greater. If the new window value W' is greater than the maximum window that can be advertised by any connection in the slot, the session is redirected to the wait queue WAQ 116. Here it may be noted that the RMSS adjustments (i.e., [X] or {X}) done for the advertised window sizes is optional. Some devices work more efficiently with adjustment to the received maximum segment size. However, in general, Tx/Rx controller logic will work even without the RMSS adjustments.

Table 1, below, illustrates in detail a portion of the operation of an exemplary process for controlling transmit and receive throughput over TCP according to an embodiment of the subject matter described herein. In Table 1, events are numbered sequentially starting from event 1. Event numbers are shown in the left-most column of the table, with the event description to the right of the event number. Other columns show the value of the slot timer, the calculated slot limit, and the calculated ideal maximum throughput per session. Information about two sessions is also shown. For each session, the session's advertised window size (WS) and amount of data received (Rx) is shown, along with a wait queue status bit (WAQ) which is set to 1 if the session has been put onto the wait queue. A hyphen "-" indicates either a value of "0" or indicates that no activity has occurred, depending on the column. Values that are recalculated or changed are highlighted in the row where the change occurred.

TABLE 1

Example 1

| Max 10M bits per slot | | Slot | | Session 1 | | | Session 2 | | |
|---|---|---|---|---|---|---|---|---|---|
| # | Event | Timer | Limit (Mb) | IdealMax | WS | Rx | WAQ | WS | Rx | WAQ |
| 1 | Slot timer fires | 1 | 10 | - | - | - | - | - | - | - |
| 2 | Ideal Max calc. (10/2 sessions) | - | 10 | 5 | - | - | - | - | - | - |
| 3 | WS1 set to 5M | - | 10 | 5 | 5 | - | - | - | - | - |
| 4 | WS2 set to 5M | - | 10 | 5 | 5 | - | - | 5 | - | - |
| 5 | Session 1 advertises 5M window | - | 10 | 5 | 5 | - | - | 5 | - | - |
| 6 | Session 2 advertises 5M window | - | 10 | 5 | 5 | - | - | 5 | - | - |
|  |  | - | 10 | 5 | 5 | - | - | 5 | - | - |
| 7 | Session 1 receives 4M of data | - | 10 | 5 | 5 | 4 | - | 5 | - | - |
| 8 | Slot limit recalculated = 6M | - | 6 | 5 | 5 | - | - | 5 | - | - |
| 9 | WS1 recalculated, remains 5M | - | 6 | 5 | 5 | - | - | 5 | - | - |
| 10 | Session 1 advertises 5M window | - | 6 | 5 | 5 | - | - | 5 | - | - |
|  |  | - | 6 | 5 | 5 | - | - | 5 | - | - |
| 11 | Session 2 receives 3M of data | - | 6 | 5 | 5 | - | - | 5 | 3 | - |

TABLE 1-continued

Example 1

| | | | | | | | | | | |
|---|---|---|---|---|---|---|---|---|---|---|
| 12 | Slot limit recalculated = 3M | - | 3 | 5 | 5 | - | - | 5 | - | - |
| 13 | WS2 recalculated = 3M | - | 3 | 5 | 5 | - | - | 3 | - | - |
| 14 | Session 2 advertises 3M window | - | 3 | 5 | 5 | - | - | 3 | - | - |
| 15 | Session 2 goes to WAQ | - | 3 | 5 | 5 | - | - | 3 | - | 1 |
| | | - | 3 | 5 | 5 | - | - | 3 | - | 1 |
| 16 | Session 1 receives 5M of data | - | 3 | 5 | 5 | 5 | - | 3 | - | 1 |
| | Slot limit recalculated = -2M | - | -2 | 5 | 5 | - | - | 3 | - | 1 |
| | WS1 recalculated = 0M | - | -2 | 5 | 0 | - | - | 3 | - | 1 |
| | Session 1 advetises 0M window | - | -2 | 5 | 0 | - | - | 3 | - | 1 |
| | Session 2 goes to WAQ | - | -2 | 5 | 0 | - | 1 | 3 | - | 1 |
| | | - | -2 | 5 | 0 | - | 1 | 3 | - | 1 |
| 21 | Slot timer fires. | 1 | -2 | 5 | 0 | - | 1 | 3 | - | 1 |
| 22 | Slot limit calculated = -2 + 10 = 8 | | 8 | 5 | 0 | - | 1 | 3 | - | 1 |
| 23 | Ideal Max calc. (8/2 sessions) | - | 8 | 4 | 0 | - | 1 | 3 | - | 1 |
| 24 | WS1 set to 4M | - | 8 | 4 | 4 | - | 1 | 3 | - | 1 |
| 25 | WS2 set to 4M | - | 8 | 4 | 4 | - | 1 | 4 | - | 1 |
| 26 | Session 1 pulled from WAQ | - | 8 | 4 | 4 | - | - | 4 | - | 1 |
| 27 | Session 2 pulled from WAQ | - | 8 | 4 | 4 | - | - | 4 | - | - |
| 28 | Session 1 advertises 4M window | - | 8 | 4 | 4 | - | - | 4 | - | - |
| 29 | Session 2 advertises 4M window | - | 8 | 4 | 4 | - | - | 4 | - | - |
| | | - | | | | | | | | |

In Table 1, above, the first event is the firing of the slot timer. For this example, the slot limit is 10M bits per slot and there are two active sessions or connections, Session 1 and Session 2. At event 2, the Ideal Max is calculated as the slot limit evenly divided among two active sessions. In this example, Ideal Max=10M/2=5M. At event 3, Session 1's advertised window size (WS1) is set to the Ideal Max value of 5M. At event 4 Session 2's advertised window size (WS2) is set to the Ideal Max value of 5M. At event 5, Session 1 advertises a 5M window. At event 6, Session 2 advertises a 5M window as well. Sessions may advertise a window size via a TCP ACK that is sent either unilaterally or in response to a previously received TCP packet.

Thus, in contrast to conventional TCP flows, the subject matter described herein makes use of unilateral TCP ACKs to increase advertised window size, such as at the beginning of each slot. Similarly, if a new connection is initiated (which can include closing and reinitiating a connection at the direction of layer 7 protocol logic) the session may start by advertising the ideal max, provided either that no data is yet received/sent in the current slot or that the slot limit did not go below the ideal max. If a window size smaller than the ideal max is advertised while initiating a session, that session will be pushed to WAQ.

At event 7, Session1 receives 4 Mbits of data. At event 8, the slot limit is reduced by the amount of data just received. In this example, the slot limit is recalculated as 10M−4M=6M. At event 9, WS1 is recalculated according to the following equation:

$$WS1 = \text{Max}(\text{Min}(\text{Ideal Max, Current Slot Limit}), WS1 - Rx)$$

$$= \text{Max}(\text{Min}(5, 6), 5 - 4)$$

$$= \text{Max}(5, 1)$$

$$= 5$$

Thus, WS1 remains 5M. At event 10, Session 1 advertises a 5M window. In one embodiment, Session 1 may opt to not advertise a window size if the new size is the same as the old size.

At event 11, Session 2 receives 3M of data. At event 12, the slot limit is reduced by the amount of data just received. In this example, the slot limit is recalculated as 6M−3M=3M. At event 13, WS2 is recalculated according to the following equation:

$$WS2 = \text{Max}(\text{Min}(\text{Ideal Max, Current Slot Limit}), WS2 - Rx)$$

$$= \text{Max}(\text{Min}(5, 3), 5 - 3)$$

$$= \text{Max}(3, 2)$$

$$= 3$$

Here, WS2 is reduced to 3M. At event 14, Session 2 advertises a 3M window size. At event 15, it is determined that WS2 (3)<Ideal Max (5), and so Session 2 is put onto the Wait Queue, e.g., the WAQ bit is set.

At event 16, Session 1 receives 5M of data. At event 17, the slot limit is reduced by the amount of data just received. In this example, the slot limit is recalculated as 3M−5M=−2M. At event 18, WS1 is recalculated according to the equation WS1=Max(Min(5,−2), 5-5)=Max(−2,0)=0. At event 19, Session 1 advertises a 0M window, effectively stopping further transmissions from the sender. At event 20, it is determined that WS1 (0)<Ideal Max (5), and therefore Session 1 is put onto the Wait Queue.

At event 21, the slot timer fires again, signifying the end of the current slot and the beginning of a new slot. In this example, the previous slot received 12M, exceeding its 10M target by 2M to give a current slot limit of −2M. The throughput of the previous slot is taken into consideration when calculating the throughput of the next slot. Thus, at event 22, the limit for the new slot is calculated as New Slot Limit=Previous Slot Achievement+Maximum Slot Target Throughput. In this example, the new slot limit=−2M+

10M=8M. At event 23, the Ideal Max is calculated as the new slot limit evenly divided among the two active sessions. In this example, the Ideal Max for each session is set to 8M/2=4M.

It is noted that in some circumstances the session's current advertised window size may be larger than the new ideal max. Because TCP protocol does not allow a session's advertised window size to be reduced immediately, the window size is reduced at a future opportunity point, such as when data is received and when a connection is initiated again. For another connected session the current advertised window size may be less than the new ideal max, in which case the advertised window size may be immediately increased, which is allowed by TCP protocol. In one embodiment, the advertised window size of a newly initialized session will not be greater than the ideal max.

At event 24, WS1 is set to the new Ideal Max, and at event 25, WS2 is set to the new Ideal Max also. At event 26, Session 1 is pulled from the Wait Queue. New window size WS' is computed according to the following equation:

$$M(i) = \text{Min}(\text{Initial } Rx \text{ Window}, \text{Current Slot Limit}/\text{Active Sessions})$$
$$= \text{Min}(5, 8/2)$$
$$= \text{Min}(5, 4)$$
$$= 4$$
$$WS' = \text{Min}(M(i), \text{Current Slot Limit})$$
$$= \text{Min}(4, 8)$$
$$= 4$$

Thus, in the example above, WS1 is calculated as 4M. At event 27, Session 2 is also pulled from the Wait Queue and its new WS is calculated in a like manner. In the example above WS2 also =4M. At event 28, Session 1 advertises its new window size of 4M, and at event 29, Session 2 also advertises its new window size of 4M.

In this manner, a target throughput has been split across multiple slots, each slot having 10 Mbits in this example. The achieved value of the first slot was 12M, exceeding the slot target by 2M. As a result, the next slot limit was set to 8M to compensate for the activity in the previous slot. Table 1, above, also illustrates that when data is received for a session, the window of that session is adjusted based on the size of the received data (Rx), available bandwidth (Current Slot Limit), last advertised window value (WS), and the number of parallel connections in the current slot (included in the calculation of Ideal Max.) Table 1 also illustrates that if a session's window size is reduced below the Ideal Max, the size is readjusted at the beginning of the next time slot. Table 1 also illustrates that when a session is awakened or removed from the Wait Queue, that session's advertised window size may be increased. For example, at event 24, Session 1's window size increases from 0M to 4M and at event 25, Sessions 2's window size increases from 3M to 4M.

Although not illustrated in Table 1, when a session transmits data, the window of that session may also be adjusted based on the size of the transmitted data (TX), available bandwidth, last advertised window size, and the number of parallel connections in the current slot. If the session's window size (or the slot's current throughput limit) is less than the amount of data that the session has to transmit, the session is allowed to transmit only as much data as the current window size or slot limit will allow, after which the session is put onto a Send Queue and further transmission is suspended for the rest of the slot. At the beginning of the next slot (e.g., when the slot timer fires) if the new slot limit allows, a session currently on the Send Queue is removed from the Send Queue and allowed to transmit the remainder of the data, e.g., the data that the session was not able to send in the previous slot.

In one embodiment, new sessions are added only at the beginning of a slot. The initial window size of the new connection will be based on the number of parallel connections allowed and the amount of bandwidth that is left.

It will be understood by one of ordinary skill in the art that the subject matter described herein is complementary to and thus may be combined with conventional methods. For example, the systems and methods described herein may coordinate with conventional layer 7 throughput methods such as manipulation of buffer lengths passed to send/receive APIs exposed by layer 4 to layer 7. One advantage that the subject matter described herein maintains over conventional methods, however, is that the subject matter described herein obviates the need for layer 4 to store any unread data. If too much data is read for one slot, less data will be read for the next slot, thus avoiding the need to buffer data in some intermediate layer between layers 4 and 7. In other words, the methods described herein make it possible to eliminate the send queue 114 and receive queue 118 from FIG. 1. This has the advantage that the layer 7 entity will see exactly the same data stream that the intermediate layers see.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for controlling transmit and receive throughput over TCP, the method comprising:
   at a first node that transmits TCP packets to and receives TCP packets from a second node:
      splitting a target TCP packet throughput across a plurality of consecutive time slots, each slot having a target throughput value, wherein the target throughput value for each of the time slots is apportioned among one or more active sessions;
      determining whether an achieved throughput value for a current slot matches the target throughput value for the current slot;
      upon a determination that the achieved throughput value for the current slot does not match the target throughput value for the current slot, adjusting the target throughput value for at least one of the current slot and a subsequent slot;
      controlling transmit throughput from the first node to the second node by transmitting TCP packets from the first node to the second node according to the target throughput value for the current slot; and
      controlling receive throughput from the second node to the first node by dynamically calculating an advertised receive window size according to the target throughput value for the current slot and communicating the advertised receive window size to the second node.

2. The method of claim 1 wherein for each slot, the target throughput value is shared by a plurality of sessions and wherein the target throughput value is divided among the plurality of sessions, wherein each of the plurality of sessions has its own target throughput value that is a portion of the target throughput value for that slot.

3. The method of claim 1 wherein determining whether the achieved throughput value matches the target throughput value for the current slot comprises determining, for each of the plurality of sessions, whether that session's achieved throughput value matches that session's target throughput for the current slot.

4. The method of claim 3 wherein, for each of the plurality of sessions, upon a determination that that session's achieved throughput value exceeds that session's target throughput for the current slot, that session is placed into a queue and transmission of data for that session is suspended at least until the next slot.

5. The method of claim 1
wherein the advertised receive window size is initially calculated for a new connection between the first and second nodes.

6. The method of claim 1 wherein controlling transmit throughput includes adjusting the target throughput for the current slot or the subsequent slot based on the amount of data sent during the current slot.

7. The method of claim 1 wherein controlling receive throughput includes adjusting the advertised receive window based on at least one of: the amount of data received, the available throughput, the last advertised value of the receive window, and the number of parallel connections that are supported for the current slot.

8. The method of claim 1 comprising determining whether the advertised receive window size is reduced below a threshold value, and, in response to determining that the advertised receive window size is reduced below a threshold value, resetting the advertised receive window size to a default value at the subsequent slot.

9. The method of claim 8 wherein at least one of the threshold value and the default value comprises an equal distribution value.

10. The method of claim 1 comprising, for one of the at least one session:
monitoring cumulative throughput for the session over a plurality of slots;
comparing the cumulative throughput for the session to a threshold value; and
adjusting, based on the comparison, the target throughput value for the session.

11. A system for controlling transmit and receive throughput over TCP, the system comprising:
a first node having a network interface for transmitting TCP packets to and receiving TCP packets from a second node over a packet network, the first node having a throughput control module for:
splitting a target TCP packet throughput across a plurality of consecutive time slots, each slot having a target throughput value, wherein the target throughput value for each of the time slots is apportioned among one or more active sessions;
determining whether an achieved throughput value for a current slot matches the target throughput value for the current slot; and
upon a determination that the achieved throughput value for the current slot does not match the target throughput value for the current slot, adjusting the target throughput value for at least one of the current slot and a subsequent slot;
wherein the throughput control module controls transmit throughput from the first node to the second node by transmitting TCP packets from the first node to the second node according to the target throughput value for the current slot and wherein the throughput control module controls receive throughput from the second node to the first node by dynamically calculating an advertised receive window size according to the target throughput value for the current slot and communicating the advertised receive window size to the second node.

12. The system of claim 11 wherein for each slot, the target throughput value is shared by a plurality of sessions and wherein the control module apportions the target throughput value among the plurality of sessions, wherein each of the plurality of sessions has its own target throughput value that is a portion of the target throughput value for that slot.

13. The system of claim 11 wherein determining whether the achieved throughput value matches the target throughput value for the current slot comprises determining, for each of the plurality of sessions, whether that session's achieved throughput value matches that session's target throughput for the current slot.

14. The system of claim 13 wherein, for each of the plurality of sessions, upon a determination that that session's achieved throughput value exceeds that session's target throughput for the current slot, that session is placed into a queue and transmission of data for that session is suspended at least until the next slot.

15. The system of claim 11 wherein
the advertised receive window size is initially calculated for a new session between the first and second nodes.

16. The system of claim 11 wherein the throughput control module controls transmit throughput by adjusting the target throughput for the current slot or the subsequent slot based on the amount of data sent during the current slot.

17. The system of claim 11 wherein the throughput control module controls receive throughput by adjusting the advertised receive window based on at least one of: the amount of data received, the available throughput, the last advertised value of the receive window, and the number of parallel sessions that are supported for the current slot.

18. The system of claim 11 wherein the throughput control module determines whether the advertised receive window size is reduced below a threshold value, and, in response to determining that the advertised receive window size is reduced below a threshold value, resets the advertised receive window size to a default value at the subsequent slot.

19. The system of claim 18 wherein at least one of the threshold value and the default value comprises an equal distribution value.

20. A non-transitory computer readable medium having stored thereon executable instructions that when executed by the processor of a computer control the computer to perform steps comprising:
splitting a target TCP packet throughput across a plurality of consecutive time slots, each slot having a target throughput value, wherein the target throughput value for each of the time slots is apportioned among one or more active sessions;
determining whether an achieved throughput value for a current slot matches the target throughput value for the current slot;
upon a determination that the achieved throughput value for the current slot does not match the target throughput value for the current slot, adjusting the target throughput value for at least one of the current slot and a subsequent slot;
controlling transmit throughput from the first node to the second node by transmitting TCP packets from the first node to the second node according to the target throughput value for the current slot; and controlling receive throughput from the second node to the first node by dynamically calculating an advertised receive window size according to the target throughput value for the current slot and communicating the advertised receive window size to the second node.

* * * * *